Figure 1:
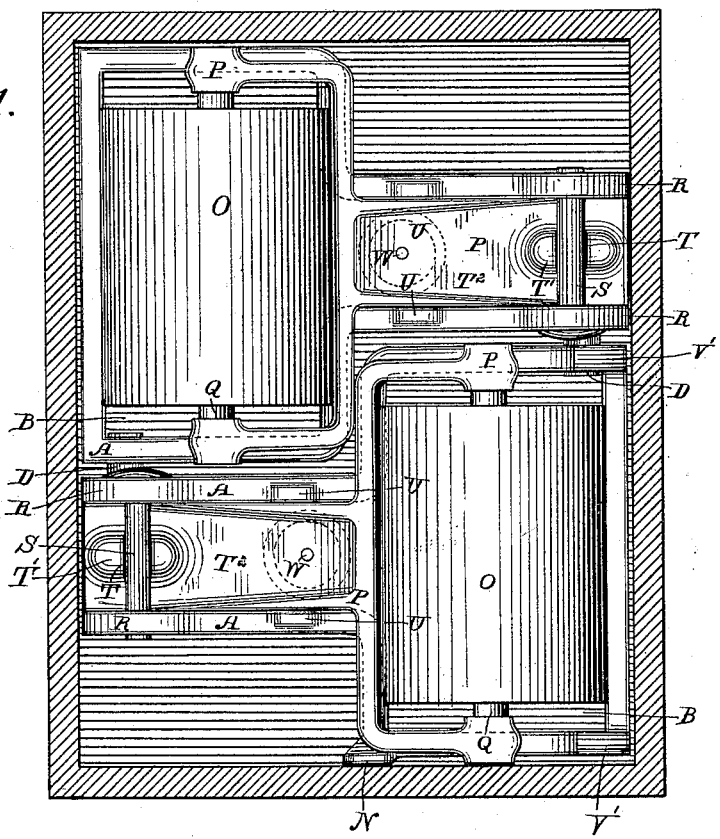
Figure 2:
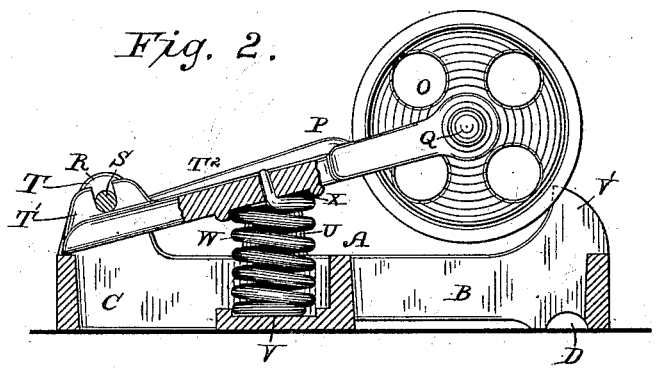

(No Model.)

J. TIMMS.
CAR AXLE BOX.

No. 358,583. Patented Mar. 1, 1887.

WITNESSES
E. A. Newman,
C. M. Newman.

INVENTOR
James Timms
By his Attorneys
Baldwin, Hopkins & Peyton.

UNITED STATES PATENT OFFICE.

JAMES TIMMS, OF COLUMBUS, OHIO, ASSIGNOR OF ONE-HALF TO B. F. REES, OF SAME PLACE.

CAR-AXLE BOX.

SPECIFICATION forming part of Letters Patent No. 358,583, dated March 1, 1887.

Application filed October 2, 1886. Serial No. 215,165. (No model.)

*To all whom it may concern:*

Be it known that I, JAMES TIMMS, of Columbus, in the county of Franklin and State of Ohio, have invented certain new and useful Improvements in Car-Axle Boxes, of which the following is a specification, reference being had to the accompanying drawing.

My improvements relate particularly to what are known as "lubricating-rollers" in car-axle boxes.

My present invention is in some respects similar to but is an improvement upon that for which I have applied for Letters Patent of the United States, my application being filed June 8, 1886, Serial No. 204,490. In that application I have shown a nest of three skeleton castings, each carrying a short lubricating-roller.

In my present invention I employ two similar but wider skeleton castings, each carrying a longer roller than in the case where three are employed.

Referring to the accompanying drawing, illustrating my improvements, A indicates a light skeleton casting or frame having a wide open part, B, and a narrow hollow or open part, C. Each of these skeleton frames is provided with a lug, D, on one side of its narrow part, and a recess or notch, E, on one side of its wide part, the lugs being provided to fit in the recesses, so as to hold the frames together in place within an axle-box sufficiently for practical purposes, as shown in the drawings and in said application.

Upon one frame of each pair of frames, which frame is designed to be used next the outer end of the axle-box, I have provided a spur, N, similar to that referred to in my said application, and for the same purpose—viz., to furnish a stop or bearing for a central downward projection upon an end bearing for the journal, not here illustrated, because these features form no part of my present improvements, but are covered in my said application.

O indicates the oil-rollers, which are each supported in a pivoted cast roller-holder, P, provided with a roller-axle, Q.

R R indicate upwardly-projecting lugs, through which passes a pivot-pin, S, through a notch, T, in a lug, T', in the shank T² of the roller-holder.

U U indicate guide-lugs for the shank of the roller-holder.

V is a spring-seat cast in the bottom of the skeleton frame, in which a coiled spring, W, is placed and seated in another spring-seat, X, on the bottom part of the shank of the roller-holder.

Y indicates lugs or projections serving as guides for the rollers.

On account of the interlocking of the narrow and wide parts of the skeleton frames, when they are made to fit in the bottom of an axle-box, I find it practicable to use two frames and rollers, instead of three. This is due not only to the interlocking, but also to the fact that the point of pivoting each roller is brought close to the center or middle of the bottom of the box on account of the form of my skeleton frames, so that they will not twist out of place, the interlocking being nearly under the pivot, or more nearly under it than if the frames were of different shape or filled the entire box on both sides.

I find it to be a material practical improvement to cast and pivot the roller-holder as above described, and to provide a spiral coiled spring seated upon the skeleton frame, instead of having the arrangement shown in my said application.

What I claim as my improvement is—

The combination, with a skeleton frame, A, having the wide open part B and a narrow open part, C, and provided with lugs R R, of roller-holder P, pivoted to the said lugs by means of pin S, and spring W, seated at its opposite ends between the skeleton frame and roller-holder, all substantially as set forth.

In testimony whereof I have hereunto subscribed my name.

JAMES TIMMS.

Witnesses:
DAVID T. RAMSEY,
W. P. DUNLAP.